US010613557B2

(12) United States Patent
Holub et al.

(10) Patent No.: US 10,613,557 B2
(45) Date of Patent: *Apr. 7, 2020

(54) HEATING, VENTILATION, AND AIR CONDITIONING SYSTEM BOILER CONTROLLER

(71) Applicant: Honeywell International Inc., Morris Plains, NJ (US)

(72) Inventors: Ondrej Holub, Prague (CZ); Martin Strelec, Chodov (CZ)

(73) Assignee: Honeywell International Inc., Morris Plains, NJ (US)

( * ) Notice: Subject to any disclaimer, the term of this patent is extended or adjusted under 35 U.S.C. 154(b) by 88 days.

This patent is subject to a terminal disclaimer.

(21) Appl. No.: 15/912,304

(22) Filed: Mar. 5, 2018

(65) Prior Publication Data

US 2018/0196451 A1    Jul. 12, 2018

Related U.S. Application Data

(63) Continuation of application No. 14/682,273, filed on Apr. 9, 2015, now Pat. No. 9,927,820.

(51) Int. Cl.
    *G05D 23/19*    (2006.01)
    *G05B 15/02*    (2006.01)
    *G05B 17/02*    (2006.01)

(52) U.S. Cl.
    CPC ......... *G05D 23/1923* (2013.01); *G05B 15/02* (2013.01); *G05B 17/02* (2013.01); *G05B 2219/2614* (2013.01)

(58) Field of Classification Search
    CPC .................. G05B 15/02; G05B 17/02; G05B 2219/2614; G05D 23/1923
    See application file for complete search history.

(56) References Cited

U.S. PATENT DOCUMENTS

| | | |
|---|---|---|
| 3,758,762 A | 9/1973 | Littman et al. |
| 6,173,902 B1 | 1/2001 | Bauer et al. |
| 7,826,908 B2 | 11/2010 | Cheng et al. |
| 7,922,155 B2 | 4/2011 | Havlena |
| 7,930,045 B2 | 4/2011 | Cheng |
| 8,068,923 B2 * | 11/2011 | Piche .................. H02J 3/38 700/286 |
| 8,326,464 B2 | 12/2012 | Clanin |
| 2009/0118873 A1 | 5/2009 | Cheng et al. |
| 2010/0117573 A1 | 5/2010 | Cheng |
| 2011/0066298 A1 | 3/2011 | Francino et al. |
| 2012/0010758 A1 | 1/2012 | Francino et al. |

(Continued)

OTHER PUBLICATIONS

Mohammad Komareji, et al. Efficient Water Supply in HVAC Systems, Ph.D. Thesis. Sep. 2008. 155 pages. Section of Automation & Control, Department of Electronic Systems, Aalborg University, Denmark. ISBN 978-87-92328-07-6.

*Primary Examiner* — Chad G Erdman (57) ABSTRACT

Heating, ventilation, and air conditioning (HVAC) system boiler controllers are described herein. One controller includes a memory and a processor configured to execute executable instructions stored in the memory to determine a change to a set point of the boiler that would lower a cost of operating the boiler, determine whether the change to the set point of the boiler is possible for the boiler, and make the change to the set point of the boiler upon determining the change is possible.

20 Claims, 4 Drawing Sheets

(56) References Cited

U.S. PATENT DOCUMENTS

| | | |
|---|---|---|
| 2012/0053720 A1 | 3/2012 | Mathur et al. |
| 2013/0151019 A1 | 6/2013 | Federspiel |
| 2016/0146118 A1* | 5/2016 | Wichmann ............... F02C 9/50 |
| | | 701/100 |
| 2016/0169545 A1 | 6/2016 | Mangsuli et al. |
| 2016/0169546 A1 | 6/2016 | Mangsuli et al. |
| 2016/0261115 A1* | 9/2016 | Asati ...................... H02J 3/14 |

* cited by examiner

HEATING, VENTILATION, AND AIR CONDITIONING SYSTEM BOILER CONTROLLER

PRIORITY INFORMATION

This application is a Continuation of U.S. application Ser. No. 14/682,273, filed Apr. 9, 2015, the contents of which are incorporated herein by reference.

TECHNICAL FIELD

The present disclosure relates to heating, ventilation, and air conditioning system boiler controllers.

BACKGROUND

A heating, ventilation, and air conditioning (HVAC) system can be used to control the environment of a building. For example, an HVAC system can be used to control the air temperature, humidity, and/or air quality of a building.

One of the major energy consumers of an HVAC system is a boiler (e.g., boiler plant). Reducing the energy consumption of the boiler of an HVAC system can reduce the energy consumption, and therefore reduce the operational cost, of the HVAC system.

The energy consumption of a boiler plant may depend on the set points of the boiler, such as the supply water temperature and the pump speed, for example. In previous approaches, the set points of the boiler may be fixed (e.g., may not change during operation of the boiler), or may be determined (e.g., changed during operation of the boiler) based on reset curves (e.g., based on the outside air temperature) or an estimate of the current heat demand of the HVAC system and/or building.

However, fixing the boiler set points or determining the boiler set points based on reset curves may be ineffective at reducing the energy consumption of the boiler. Further, determining the boiler set points based on a current heat demand estimate may be difficult, as the availability of the information needed to do so may be limited.

DETAILED DESCRIPTION

Heating, ventilation, and air conditioning (HVAC) system boiler controllers are described herein. For example, one or more embodiments include a memory and a processor configured to execute executable instructions stored in the memory to determine a change to a set point of the boiler that would lower a cost of operating the boiler, determine whether the change to the set point of the boiler is possible for the boiler, and make the change to the set point of the boiler upon determining the change is possible.

HVAC system boiler controllers in accordance with the present disclosure can determine and/or change (e.g., adjust) the set point(s) of a boiler such that the energy consumption, and therefore the operational cost, of the boiler (e.g., of the HVAC system) is effectively reduced. That is, determining and/or changing the set point(s) of a boiler in accordance with the present disclosure can effectively reduce the energy consumption, and therefore effectively reduce the operational cost, of the boiler.

Further, HVAC system boiler controllers in accordance with the present disclosure may determine and/or change the set point(s) of the boiler utilizing information (e.g., data) readily available to the controller. As such, HVAC system boiler controllers in accordance with the present disclosure may be able to determine and/or change the set point(s) of the boiler in a quicker, more accurate, and/or easier manner than previous approaches.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a" or "a number of" something can refer to one or more such things. For example, "a number of manipulated variables" can refer to one or more manipulated variables.

Figure 1A:
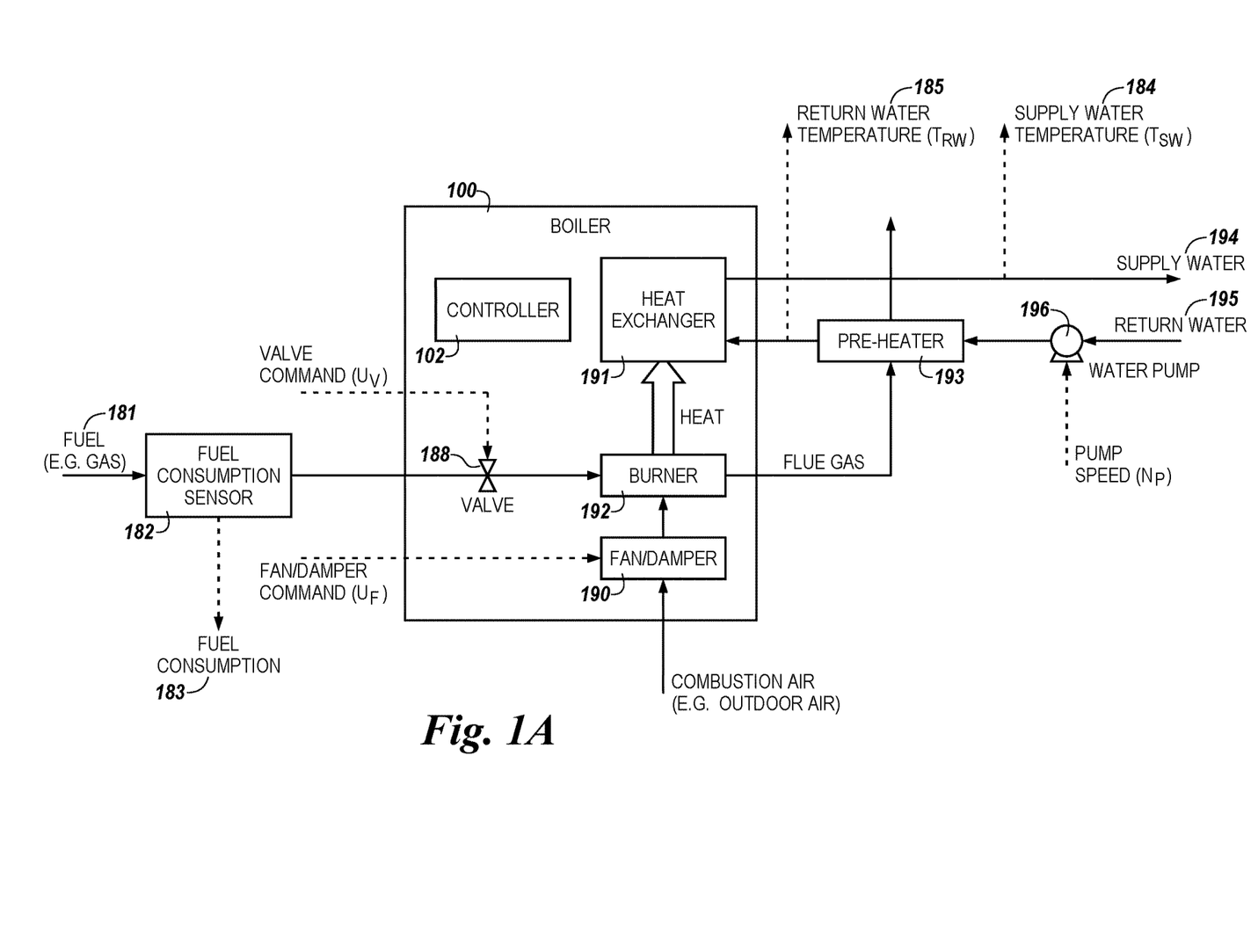
FIG. 1A illustrates an HVAC system boiler in accordance with one or more embodiments of the present disclosure.
Figure 1B:
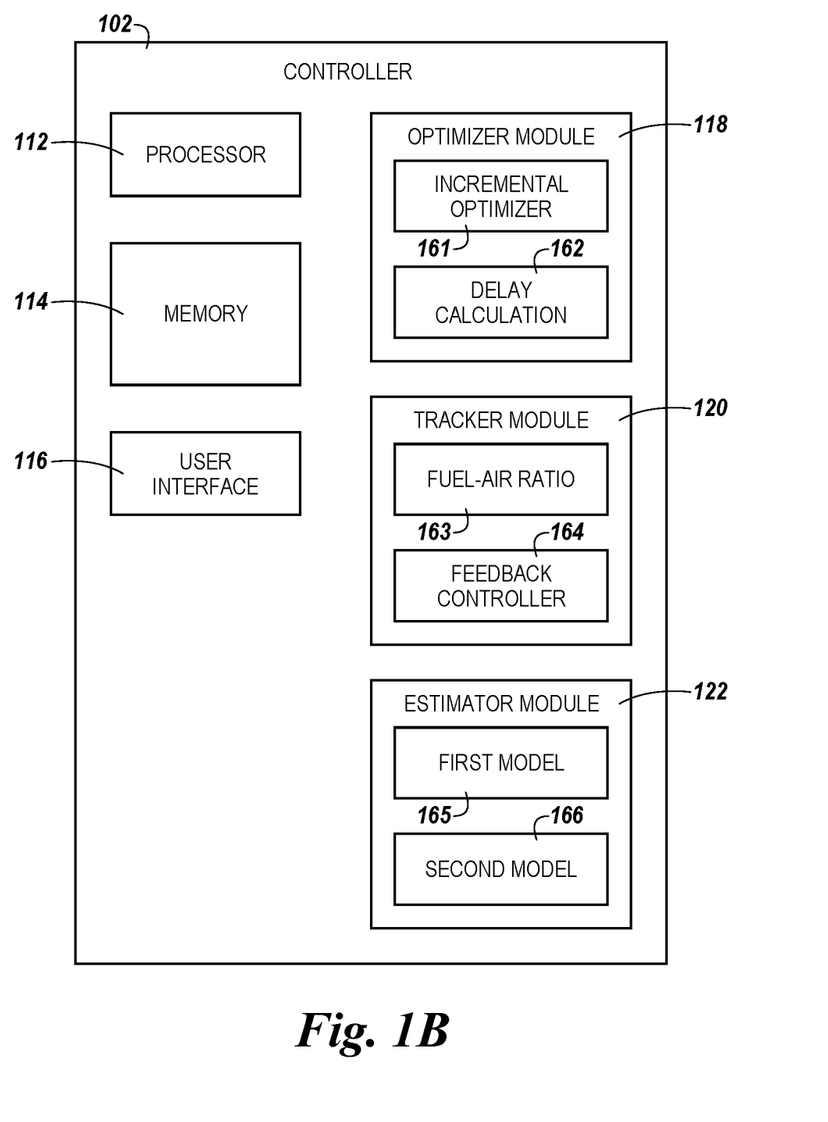
FIG. 1B illustrates an HVAC system boiler controller in accordance with one or more embodiments of the present disclosure.

FIG. 1A illustrates a heating, ventilation, and air conditioning (HVAC) system boiler 100 in accordance with one or more embodiments of the present disclosure, and FIG. 1B illustrates an HVAC system boiler controller 102 in accordance with one or more embodiments of the present disclosure. That is, FIG. 1B illustrates a controller 102 for a boiler 100 (e.g., a boiler plant that includes boiler 100 and a number of water pumps) of an HVAC system illustrated in FIG. 1A.

In the embodiment illustrated in FIG. 1A, controller 102 is included in (e.g., located within) boiler 100. However, embodiments of the present disclosure are not so limited. For example, in some embodiments, controller 102 may be separate from (e.g., located outside of) boiler 100. That is, in some embodiments, controller 102 can be a stand-alone device.

As shown in FIG. 1A, boiler 100 can include a heat exchanger 191 and a burner 192. The burner 192 can output heat to a heat exchanger 191 and flue gas to an external pre-heater 193. Supply water 194 (e.g., at a particular temperature $T_{SW}$ 184) can be output from the heat exchanger 191 and the water can return 195 (e.g., at a particular temperature $T_{RW}$ 185) through a water pump 196 to the pre-heater 193 and back to the heat exchanger 191 of the boiler 100.

As shown in FIG. 1A, boiler 100 can include a valve 188 and a fan 190 (and, in some embodiments, a damper). Controller 102 can control the position of the valve 188, speed of the fan 190, and/or position of the damper. Based on the various controlled positions and/or speeds, fuel (e.g., gas) 181 can be input to the burner 192 of the boiler 100. The rate of fuel input can be controlled by the valve position, damper position, and/or speed of the fan 190.

The fan 190 can include a variable-frequency drive (VFD) fan or a constant-frequency drive (CFD) fan, among other fans. For instance, a CFD fan can include a damper. Combustion air (e.g., outdoor air) can be input to the VFD fan, or input to the CFD fan, and then sent to the damper.

As illustrated by FIG. 1A, the input fuel 181 can be measured by a fuel consumption sensor 182 to determine total fuel consumption 183 of boiler 100. Further, a temperature sensor (not shown in FIG. 1A) can measure the supply water temperature 184 (e.g., $T_{SW}$). The temperature sensor can send the measured supply water temperature 184 to the controller 102.

The controller 102 can determine a difference in the supply water temperature 184 and a supply water temperature set point. The supply water temperature set point may be determined and/or changed by controller 102, as will be further described herein. Based on the difference and/or change, the controller 102 can perform a control action (e.g., increase/decrease fan speed, or open/close a damper).

Controller 102 can control the operation (e.g., the operating parameters) of boiler 100. For example, boiler 100 may have a number of manipulated variables and a number of controlled variables associated therewith. The controlled variables can be the variables of boiler 100 that controller 102 is attempting to control (e.g., set and/or change). For instance, the controlled variables can include the supply water temperature and/or pump speed of boiler 100. The manipulated variables can be the operating parameters for boiler 100, which can control the controlled variables of the boiler. For instance, the manipulated variables can include the firing rate of boiler 100. That is, controller 102 can control the manipulated variables of boiler 100, which in turn can control the controlled variables of the boiler. For instance, controller 102 can determine, and make changes to, the set points of the controlled variables of boiler 100, as will be further described herein.

As shown in FIG. 1B, controller 102 can include a memory 114 and a processor 112. Memory 114 can be any type of storage medium that can be accessed by processor 112 to perform various examples of the present disclosure. For example, memory 114 can be a non-transitory computer readable medium having computer readable instructions (e.g., computer program instructions) stored thereon that are executable by processor 112 to determine, and make changes to, the set points of the controlled variables of boiler 100 in accordance with the present disclosure. That is, processor 112 can execute the executable instructions stored in memory 114 to determine, and make changes to, the set points of the controlled variables of boiler 100 in accordance with the present disclosure.

Memory 114 can be volatile or nonvolatile memory. Memory 114 can also be removable (e.g., portable) memory, or non-removable (e.g., internal) memory. For example, memory 114 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

Further, although memory 114 is illustrated as being located in controller 102, embodiments of the present disclosure are not so limited. For example, memory 114 can also be located internal to another computing resource (e.g., enabling computer readable instructions to be downloaded over the Internet or another wired or wireless connection).

As shown in FIG. 1B, controller 102 includes a user interface 116. A user (e.g., operator) of controller 102 (e.g., boiler 100), such as, for instance, a field engineer or technician for the HVAC system that includes boiler 100, can interact with controller 102 via user interface 116. For example, user interface 116 can provide (e.g., display and/or present) information to the user of controller 102, and/or receive information from (e.g., input by) the user of controller 102. For instance, in some embodiments, user interface 116 can be a graphical user interface (GUI) that can include a display (e.g., a screen) that can provide and/or receive information to and/or from the user of controller 102. The display can be, for instance, a touch-screen (e.g., the GUI can include touch-screen capabilities). As an additional example, user interface 116 can include a keyboard and/or mouse the user can use to input information into controller 102. Embodiments of the present disclosure, however, are not limited to a particular type(s) of user interface.

As shown in FIG. 1B, controller 102 can include a set point optimizer module 118, a set point tracker module 120, and an estimator module 122. As described herein, a "module" can include computer readable instructions that can be executed by a processing resource (e.g., processor 112) to perform a particular function. A module can also include hardware, firmware, and/or logic that can perform a particular function. As used herein, "logic" is an alternative or additional processing resource to execute the actions and/or functions, described herein, which includes hardware (e.g., various forms of transistor logic, application specific integrated circuits (ASICs)), as opposed to computer executable instructions (e.g., software, firmware) stored in memory and executable by a processing resource.

Estimator module 122 can determine (e.g., generate and/or build) and/or include (e.g., store) two different models (e.g., static models). The first model 165 can be a model (e.g., mapping) of the relationship between a number of controlled variables of boiler 100 and a number of manipulated variables and operating conditions (e.g., disturbances) of boiler 100. The second model 166 can be a model (e.g., mapping) of the relationship between the cost of operating boiler 100 and the number of manipulated variables and operating conditions of boiler 100.

As an example, the first model 165 can include a look up table that includes values of the controlled variables for different values of the manipulated variables and different operating conditions, and the second model 166 can include a look up table that includes the cost of operating the boiler for different values of the manipulated variables and different operating conditions. The models, however, are not limited to look up tables. For example, in some embodiments, the models can be functions, such as multivariate static functions or radial basis functions, among other types of functions. Examples of the models will be further described herein (e.g., in connection with FIGS. 2A-2B).

The controlled variables can include, for example, the supply water temperature and/or pump speed of boiler 100. The manipulated variables can include, for example, the firing rate of boiler 100. The operating conditions can include, for example, outside air temperature and/or the pump speed of boiler 100 (e.g., in some embodiments pump speed may be a controlled variable, and in some embodiments pump speed may be a disturbance) and/or return water temperature. The cost of operating boiler 100 can correspond to, for example, the energy consumption of boiler 100.

In some embodiments, estimator module 122 can determine (e.g., generate, build, update, and/or adjust) the models based on real time operational data and/or behavior of boiler 100 received by controller 102, such as, for instance, the supply and/or return water temperatures of boiler 100, the pump speed of boiler 100, and/or the firing rate of boiler 100. For example, estimator module 122 can determine the models from the real time data using generally known recursive identification methods, such as, for instance, a recursive least squares method, as will be appreciated by one of skill in the art. As such, estimator module 122 can determine the models utilizing information (e.g., data) that is readily available to and/or already being utilized by controller 102.

As an example, the supply water temperature set point, the return water temperature, and the pump speed can be input into first model 165, and the firing rate and the pump speed can be input into second model 166. Further, the fuel consumption of boiler 100, and the price of the fuel, can also be input into estimator module 122. In such an example, first model 165 can be used to determine (e.g., output) the estimated steady firing rate for the boiler, and second model 166 can be used to determine (e.g., output) the cost.

In some embodiments, estimator module 122 can receive (e.g., via user interface 116) the models from the user (e.g., operator) of controller 102. For instance, the models may initially be input into estimator module 122 by the user, and then subsequently may be updated and/or adjusted during operation of boiler 100 based on the real time operational data and/or behavior of boiler 100.

In some embodiments, the models can be pre-engineered models. For instance, estimator module 122 can initially determine (e.g., build and/or generate) the models based on initial values for the controlled variables, manipulated variables, and disturbances input into estimator module 122 during commissioning of controller 102, and then subsequently update and/or adjust the models during operation of boiler 100 based on the real time operational data and/or behavior of boiler 100.

During operation of boiler 100, set point optimizer module 118 can determine a change to a number of set points of boiler 100 (e.g., a change to the set points of a number of the controlled variables of the boiler) that would lower (e.g., reduce) the cost of operating boiler 100 (e.g., that would lower the energy consumption of the boiler), and make the determined change(s) to the set point(s). For example, set point optimizer module 118 can determine whether the change(s) to the set point(s) is possible (e.g., feasible) for the boiler (e.g., whether it would be possible for the boiler to make the change(s)), and make the change(s) to the set point(s) upon determining the change(s) is possible. If the change(s) are determined to not be possible for the boiler (e.g., if the determined change(s) would be outside the operating limits of the boiler), set point optimizer module 118 may not make the change(s), and may attempt to determine an additional (e.g., different) change(s) that would lower the cost of operating boiler 100 and be possible for the boiler to make.

The number of set points of boiler 100 can include, for example, the set point of the supply water temperature of the boiler and/or the set point of the pump speed of the boiler. Set point optimizer module 118 can determine the change(s) to the set point(s) using the models determined by and/or included in estimator module 122. In determining the change(s) to the set point(s), set point optimizer module 118 may assume the energy consumption of boiler 100 is a static function of the manipulated variables and operating conditions of the boiler.

In instances in which optimizer module 118 determines changes to a single (e.g., one) set point, optimizer module 118 can make the change to the set point without making a change to any other set points of boiler 100. For example, if optimizer module 118 determines a reduction (e.g., a feasible reduction) of the set point of the supply water temperature of boiler 100 that would lower the cost of operating the boiler, the optimizer module may make this reduction while maintaining the same pump speed of the boiler.

In instances in which optimizer module 118 determines changes to a plurality of set points (e.g., more than one set point), optimizer module 118 can make the changes incrementally using incremental optimizer 161. That is, in such instances, the change to one set point would not be made until after the change to the previous set point is completed. For instance, the changes to the plurality of set points may be made such that there is a delay between each respective change, in order to minimize the transients induced by the changes. The length of the delay between each respective change may be determined by delay calculation module 162.

As an example, if optimizer module 118 determines a reduction (e.g., a feasible reduction) of the set point of the supply water temperature and an increase (e.g., a feasible increase) of the set point of the pump speed of boiler 100 that would lower the cost of operating the boiler, the optimizer module (e.g., incremental optimizer 161) may first reduce the supply water temperature set point, wait for the supply water temperature to cool to the reduced set point, and then increase the pump speed set point. The length (e.g., amount of time) of the delay between the set point changes may be determined by delay calculation module 162, and may based on (e.g., be inversely proportional to) the pump speed of boiler 100, and/or may depend on the pipe length and/or diameter of the HVAC system. An example of such incremental set point changes will be further described herein (e.g., in connection with FIG. 3).

During operation of boiler 100, controller 102 may receive an indication (e.g., a warning) that the HVAC system (e.g., one or more circuits of the HVAC system) is receiving insufficient heat. As an example, outside the boiler controller, signals from the controllers of different boiler loads (e.g., air handling units, fan coils, variable air volume boxes, etc.) can be collected and checked against symptoms of insufficient heating (e.g., finding the most open heating valve of fan coil units, checking the saturation of zone controllers, etc.). If at least one such symptom is detected, controller 102 may receive an insufficient heat indication (e.g., an insufficient heat signal for the boiler may be set to true). As an additional example, if no such signal is available from outside the boiler controller, the boiler controller may build its own signal by estimating the heat demand from the difference between the supply and return water temperatures and pump speed, and monitoring its response to the set point changes.

In such examples, optimizer module 118 may determine (e.g., using the models of estimator module 122) changes (e.g., additional changes) to the number of set points of boiler 100 that would provide sufficient heat to the HVAC system (e.g., to the circuit(s) of the HVAC system receiving insufficient heat), and make (e.g., using incremental optimizer 161) the determined change(s) to the set point(s) (e.g., upon determining the change(s) is possible). In instances in which optimizer module 118 determines changes to a single set point, optimizer module 118 can make the change to the set point without making a change to any other set points of boiler 100, and in instances in which optimizer module 118 determines changes to a plurality of set points, optimizer module 118 (e.g., incremental optimizer 161) can make the changes incrementally, as previously described herein. An example of such incremental set point changes will be further described herein (e.g., in connection with FIG. 3).

As an example, the current set point of the supply water temperature, the current pump speed, and a heat demand signal can be input into incremental optimizer 161. Further, the current pump speed can be input into delay calculation module 162. In such an example, incremental optimizer 161 can determine (e.g., output) a new supply water temperature set point and a new pump speed that would lower the cost of operating the boiler while providing sufficient heat to the HVAC system, and delay calculation module 162 can determine (e.g., output) the delay needed between the change of the supply water temperature set point and the change of the pump speed. Incremental optimizer 161 can then make the changes to the supply water temperature set point and pump speed incrementally, according to the delay determined by delay calculation module 162.

During operation of boiler 100, set point tracker module 120 can receive the determined set point change(s) from set point optimizer module 118, and track the changed set point(s) using the first model of estimator module 122 (e.g., using the look up table that includes values of the controlled variables for different values of the manipulated variables and different operating conditions). That is, after set point optimizer module 118 determines the set point change(s), set point tracker module 120 can ensure the operation of boiler 100 maintains the controlled variable(s) at the changed set point using the first model of estimator module 122 (e.g., using the look up table). For instance, set point tracker module 120 can set and/or adjust the operating parameters of boiler 100 (e.g., the operating parameters of the manipulated variables of the boiler) such that the controlled variable(s) is maintained at the changed set point. That is, the first model of estimator module 122 can be used as a static feedforward by set point tracker module 120.

As an example, set point tracker module 120 can receive the estimated steady firing rate for the boiler from first model 165, and the supply water temperature and the set point of the supply water temperature can be input into feedback controller 164 of set point tracker module 120. Feedback controller 164 can determine (e.g., output) the firing rate of the boiler, which can then be input into fuel-air ratio module 163 of set point tracker module 120. Fuel-air ratio module 163 can then determine (e.g., output) a valve command for valve 188 and a fan/damper command for fan 190 that will ensure boiler 100 maintains the supply water temperature at the set point. In some embodiments, the output of the feedback controller 164 can be based, for example, not only on the set point and measured supply temperature, but also on an estimated firing rate.

Figure 2A:
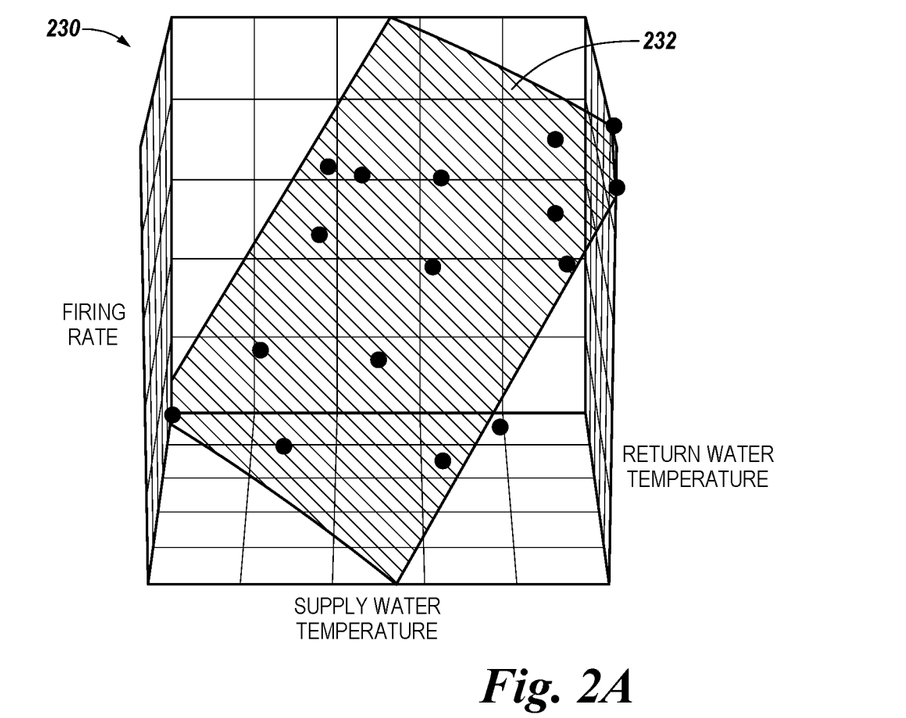
FIG. 2A illustrates an example of a model of the relationship between a number of controlled variables of a boiler and a manipulated variable of the boiler in accordance with one or more embodiments of the present disclosure.
Figure 2B:
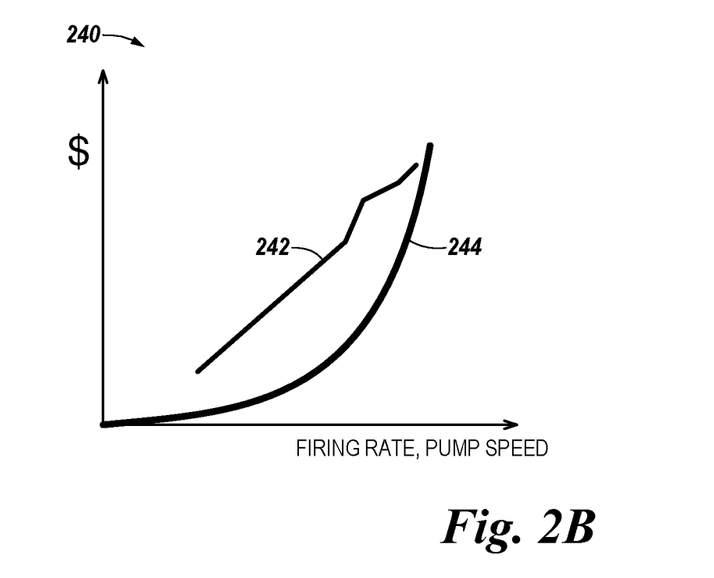
FIG. 2B illustrates an example of a model of the relationship between the cost of operating the boiler and the manipulated variable and the operating condition of the boiler in accordance with one or more embodiments of the present disclosure.

FIG. 2A illustrates an example of a model 232 of the relationship between a number of controlled variables of a boiler and a manipulated variable of the boiler for a constant operating condition (e.g., disturbance) of the boiler. As used herein, a constant operating condition can refer to a single operating condition (e.g., a pump constantly running at 2000 rpm), or an operating condition that falls within a particular range or set of possible operating conditions (e.g., a variable speed pump that may run from 1000-4000 rpm). FIG. 2B illustrates an example of a model 240 of the relationship between the cost of operating the boiler and the manipulated variable and the operating condition of the boiler. The boiler can be, for example, boiler 100 previously described in connection with FIGS. 1A and 1B. Models 232 and 240 can be determined by and/or included in estimator module 122 previously described in connection with FIG. 1B, and can be used by set point optimizer module 118 to determine changes to the set points of the controlled variables that would lower the cost of operating the boiler, as previously described in connection with FIG. 1B.

In the example illustrated in FIGS. 2A and 2B, the controlled variable is the supply water temperature of the boiler, the manipulated variable is the firing rate of the boiler, and the operating conditions are the return water temperature and pump speed of the boiler. However, embodiments of the present disclosure are not limited to this control variable, manipulated variable, and disturbance combination.

In the example illustrated in FIG. 2A, the number of data points plotted in graph 230 are used to generate model 232. Each data point can represent the supply water temperature, the return water temperature, and the firing rate of the boiler at a different point in time during the operation of the boiler, and can be determined and/or received by the boiler in real time. As such, model 232 can be used to determine what firing rate can be used by the boiler to generate a particular (e.g., desired) supply water temperature. In the example illustrated in FIG. 2A, the pump speed of the boiler is assumed to remain constant.

In the example illustrated in FIG. 2B, model 240 includes a plot 242 of the cost of operating the boiler at different firing rates, and a plot 244 of the cost of operating the boiler at different pump speeds. As such, model 240 can be used to determine what the cost of operating the boiler would be for a particular firing rate and pump speed of the boiler.

Figure 3:
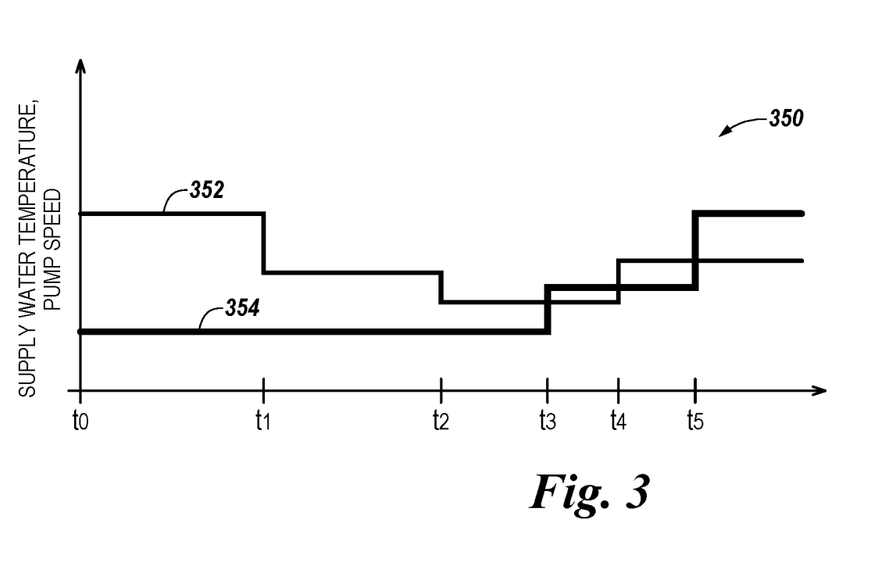
FIG. 3 illustrates a graph of an example of incremental changes made to the set points of two controlled variables of a boiler in accordance with one or more embodiments of the present disclosure.

FIG. 3 illustrates a graph 350 of an example of incremental changes made to the set points of two controlled variables of a boiler in accordance with one or more embodiments of the present disclosure. For example, line 352 represents the set point of the supply water temperature of the boiler over time, and line 354 represents the set point of the pump speed of the boiler over time. The boiler can be, for example, boiler 100 previously described in connection with FIGS. 1A and 1B, and the incremental changes to the set points can be made by set point optimizer module 118 during operation of the boiler, as previously described in connection with FIG. 1B.

For example, during operation of the boiler (e.g., after an initial time t0), set point optimizer module 118 may determine a possible (e.g., feasible) reduction of the set point of the supply water temperature of the boiler that would lower the cost of operating the boiler. This reduction can be made (e.g., by the set point optimizer module) at time t1, as illustrated in FIG. 3. However, the pump speed of the boiler may be maintained at the same speed as before time t1, as illustrated in FIG. 3.

During subsequent operation of the boiler (e.g., after time t1), set point optimizer module 118 may determine a possible (e.g., feasible) reduction of the set point of the supply water temperature of the boiler and a possible increase of the set point of the pump speed of the boiler that, in combination, would further lower the cost of operating the boiler. However, as previously described herein (e.g., in connection with FIGS. 1A and 1B), these set point changes may need to be made incrementally. As such, the set point optimizer module may first reduce the supply water temperature set point at time t2, and then, after a delay (e.g., for the supply water temperature to cool to the reduced set point), increase the pump speed set point at time t3, as illustrated in FIG. 3.

During subsequent operation of the boiler (e.g., after time t3), set point optimizer module 118 may receive an indication that the HVAC system is receiving insufficient heat. In response to the indication, the set point optimizer module may determine a possible (e.g., feasible) increase of the supply water temperature set point and a possible increase of the pump speed set point that, in combination, would provide sufficient heat to the HVAC system. However, as previously described herein (e.g., in connection with FIGS. 1A and 1B), these set point changes may need to be made incrementally. As such, the set point optimizer module may first increase the supply water temperature set point at time t4, and then, after a delay (e.g., for the supply water temperature to heat to the increased set point), increase the pump speed set point at time t5, as illustrated in FIG. 3.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A controller for a boiler of a heating, ventilation, and air conditioning (HVAC) system, comprising:
   a memory; and
   a processor configured to execute executable instructions stored in the memory to:
      determine, using a first model and a second model, a change to a set point of the boiler that would lower a cost of operating the boiler, wherein:
         the first model includes a model of a relationship between a plurality of controlled variables of the boiler and a plurality of manipulated variables of the boiler; and
         the second model includes a model of a relationship between the cost of operating the boiler and the plurality of manipulated variables;
      determine whether the change to the set point of the boiler is possible for the boiler; and
      make the change to the set point of the boiler upon determining the change is possible.

2. The controller of claim 1, wherein:
   the first model includes a look up table that includes values of the plurality of controlled variables of the boiler for different values of the plurality of manipulated variables of the boiler; and
   the second model includes a look up table that includes the cost of operating the boiler for different values of the number of manipulated variables.

3. The controller of claim 1, wherein the processor is configured to execute the instructions to determine the first model based on:
   a supply water temperature set point of the boiler;
   a return water temperature of the boiler; and
   a pump speed of the boiler.

4. The controller of claim 1, wherein the processor is configured to execute the instructions to determine the second model based on:
   a firing rate of the boiler;
   a pump speed of the boiler;
   a fuel consumption of the boiler; and
   a price of the fuel consumed by the boiler.

5. The controller of claim 1, wherein the processor is configured to execute the instructions to:
   determine a firing rate of the boiler that generates a particular supply water temperature of the boiler using the first model; and
   determine the cost of operating the boiler at the determined firing rate using the second model.

6. The controller of claim 1, wherein the processor is configured to execute the instructions to update at least one of the first model and the second model during operation of the boiler.

7. A method of operating a boiler of a heating, ventilation, and air conditioning (HVAC) system, comprising:
   determining, by a controller of the boiler using a first model and a second model, changes to a plurality of set points of the boiler that would lower a cost of operating the boiler, wherein:
      the first model includes a model of a relationship between a plurality of controlled variables of the boiler and a plurality of operating conditions of the boiler; and
      the second model includes a model of a relationship between the cost of operating the boiler and the plurality of operating conditions of the boiler; and
   making, by the controller of the boiler, the changes to the plurality of set points of the boiler, wherein the changes to the plurality of set points are made incrementally.

8. The method of claim 7, wherein:
   the first model includes a look up table that includes values of the plurality of controlled variables of the boiler for the plurality of operating conditions of the boiler; and the second model includes a look up table that includes the cost of operating the boiler for the plurality of operating conditions of the boiler.

9. The method of claim 7, wherein the method includes tracking the changed set points of the boiler using the first model.

10. The method of claim 9, wherein tracking the changed set points of the boiler includes ensuring the plurality of controlled variables of the boiler are maintained at the changed set points during operation of the boiler.

11. The method of claim 7, wherein the method includes:
determining the first model and the second model based on initial values for the plurality of controlled variables of the boiler and the plurality of operating conditions of the boiler; and
updating the first model and the second model based on updated values for the plurality of controlled variables and the plurality of operating conditions during operation of the boiler.

12. The method of claim 7, wherein the method includes generating the first model by plotting a number of data points in a graph, wherein each data point represents a supply water temperature, return water temperature, and firing rate of the boiler at a different point in time during operation of the boiler.

13. The method of claim 7, wherein the second model includes:
a plot of the cost of operating the boiler at different firing rates of the boiler; and
a plot of the cost of operating the boiler at different pump speeds of the boiler.

14. A heating, ventilation, and air conditioning (HVAC) system, comprising:
a boiler; and
a controller for the boiler, wherein:
the controller includes:
a first model, wherein the first model includes a model of a relationship between a controlled variable of the boiler and:
a plurality of manipulated variables of the boiler; and
a plurality of operating conditions of the boiler; and
a second model, wherein the second model includes a model of a relationship between a cost of operating the boiler and:
the plurality of manipulated variables of the boiler; and
the plurality of operating conditions of the boiler; and
the controller is configured to:
determine, using the first model and the second model, a change to a set point of the controlled variable of the boiler that would lower the cost of operating the boiler; and
make the change to the set point of the controlled variable of the boiler.

15. The HVAC system of claim 14, wherein:
the first model includes a function of the controlled variable of the boiler and the plurality of manipulated variables of the boiler and the plurality of operating conditions of the boiler; and
the second model includes a function of the cost of operating the boiler and the plurality of manipulated variables of the boiler and the plurality of operating conditions of the boiler.

16. The HVAC system of claim 14, wherein the controller is configured to determine of the first model and the second model based on real time operational data of the boiler.

17. The HVAC system of claim 16, wherein the real time operational data of the boiler includes:
a supply water temperature of the boiler;
a return water temperature of the boiler;
a pump speed of the boiler; and
a firing rate of the boiler.

18. The HVAC system of claim 14, wherein the controller is configured to receive at least one of the first model and the second model from a user of the controller.

19. The HVAC system of claim 14, wherein at least one of the first model and the second model is a pre-engineered model.

20. The HVAC system of claim 14, wherein the number of operating conditions of the boiler include a constant operating condition of the boiler.

* * * * *